May 19, 1942.   J. P. ECKERT, JR   2,283,545
LIGHT MODULATING METHOD AND APPARATUS
Filed July 20, 1940   2 Sheets-Sheet 1

INVENTOR
John Presper Eckert, Jr.
BY
ATTORNEYS

WITNESS

May 19, 1942.  J. P. ECKERT, JR  2,283,545

LIGHT MODULATING METHOD AND APPARATUS

Filed July 20, 1940  2 Sheets-Sheet 2

WITNESS:
Robt R Kitchel

INVENTOR
John Presper Eckert, Jr.
BY
ATTORNEYS

Patented May 19, 1942

2,283,545

UNITED STATES PATENT OFFICE 2,283,545

LIGHT MODULATING METHOD AND APPARATUS

John Presper Eckert, Jr., Philadelphia, Pa.

Application July 20, 1940, Serial No. 346,670

12 Claims. (Cl. 179—100.3)

This invention relates to a light modulating method and apparatus adaptable for use in the recording of sound on film, television or facsimile transmission, signalling or the like. Specifically, the invention involves the use as a modulating means of supersonic waves which are frequency modulated.

Supersonic waves generated in a fluid produce from the optical standpoint a grating which not only gives rise to the well known effects of ruled gratings, but additionally to certain effects peculiar to the fact that the gratings produced by the supersonic waves vary with the intensity of the waves, and travel with the waves. For example, it is well known that supersonic gratings will give rise by reflection or transmission of light to series of spectra, the intensities of the various series being dependent upon the amplitude of the waves. Well known types of interference phenomena also may be obtained by the use of such gratings.

Various proposals have been made for the use of such gratings for modulation of light beams in various fashions in the sound recording, television and similar arts. The broad use of supersonic waves for the modulation of light is, therefore, not a part of this invention, which relates essentially to the modulation of light by means of frequency modulated supersonic waves to achieve particularly advantageous results.

In the recording of sound on sensitized film, considerable difficulty is experienced in achieving proper recording of high frequencies without distortion. Mechanical systems are subject to inertial limitations, and linearity of response is difficult to achieve. Optical methods, including those involving the use of supersonic waves, eliminate inertial difficulties, but non-linearity tends to enter the problem with resulting distortion in the ultimate reproduction. One important object of the present invention is the provision of a modulating system capable of very high frequency response with extremely small amounts of distortion throughout the entire range of operation. While the invention is particularly adapted for the recording of sound on film, it will be evident as the description proceeds that the invention is applicable in allied fields, such as those indicated above, where high frequency and linear responses are necessary.

The above indicated and other objects of the invention will become apparent from the following description, read in conjunction with the accompanying drawings, in which.

Figure 1:
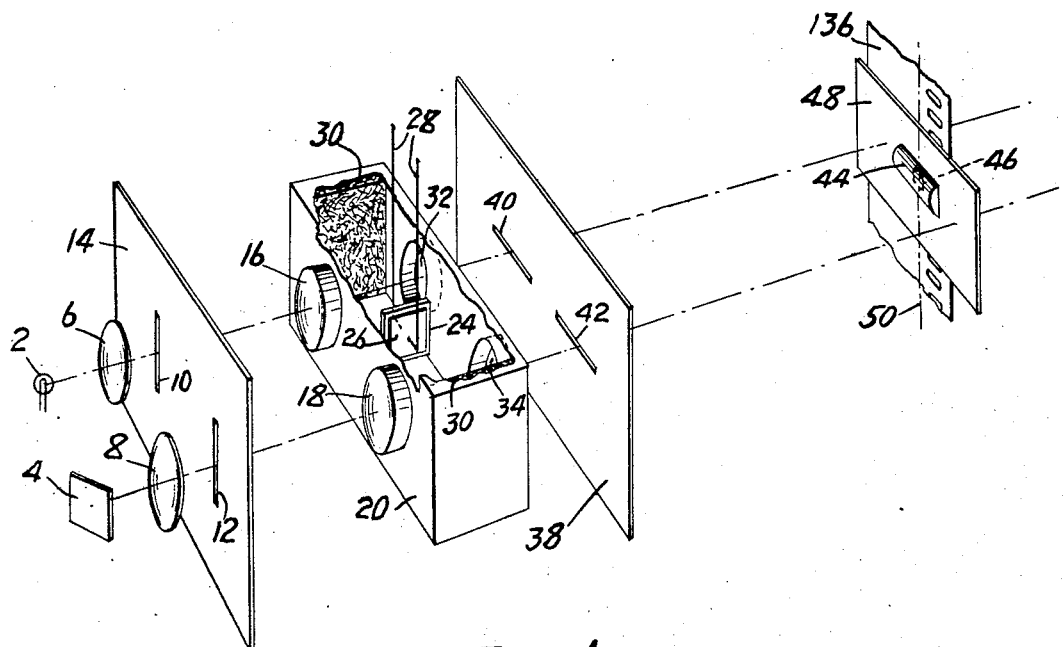
Figure 1 is a diagrammatic perspective view illustrating a preferred form of optical system provided in accordance with the invention.

Referring first to the mechanical and optical portions of the apparatus illustrated in Figure 1, there is illustrated at 2 a source of light which may be, but is not necessarily, monochromatic. This source 2 provides one beam of light directed along the upper center line in Figure 1. A mirror 4 provides a second beam directed along the lower center line illustrated in Figure 1. As will be evident hereafter, these two beams provide a symmetrical system to secure symmetry of the sound record produced by the apparatus. Two separate sources may, of course, be used. The two beams pass through condensing lenses 6 and 8, which concentrate the illumination on slits 10 and 12 illustrated in upright position and as formed in a suitable screen 14. These slits are respectively at the foci of lens systems 16 and 18 secured in the walls of a cell 20 through which the rays from the slits are accordingly directed parallel to the optical axis. The cell 20 contains a liquid such, for example, as carbon tetrachloride suitable for the transmission of supersonic waves. Within the liquid in this cell is immersed a quartz crystal 24 arranged in a plane parallel to the slits 10 and 12 and to the optical axes and serving as the source of the waves through the application thereto of voltage applied to plane conducting surfaces 26 through the leads 28 from the driving system illustrated in Figure 4. To serve for absorption of the supersonic waves and prevent standing waves, absorbent material such as glass wool, illustrated at 30, is provided in the ends of the cell 20. This arrangement need not be described in greater detail and is illustrative only, since any conventional form of supersonic wave generating arrangement may be used with such dimensions provided as are well known to those skilled in the art to be most effective. As will be evident hereafter, the source of supersonic waves need not necessarily be a quartz or other piezoelectric crystal, but may be a magnetostrictive, electrostatic, or other device suitable for the purpose.

Opposite the lens systems 16 and 18 are lens systems 32 and 34, respectively for focusing the beams passing through the cell at the plane of a film 36 on which recording is to be accomplished. Between the lens systems 32 and 34 there is interposed a screen 38 provided with slits 40 and 42 intersecting the optical axes and arranged at right angles to the slits 10 and 12 previously referred to. The film 36 moves behind a diaphragm 48 associated with other parts of a housing to shield the film from extraneous light, this diaphragm being provided with an opening 46 defining the line 50 along which recording is to be accomplished. In front of this opening 46 is a cylindrical lens arranged with its axis parallel to the slits 40 and 42 and arranged to project on the film sharp and greatly reduced images of the slits 40 and 42.

Figure 2:
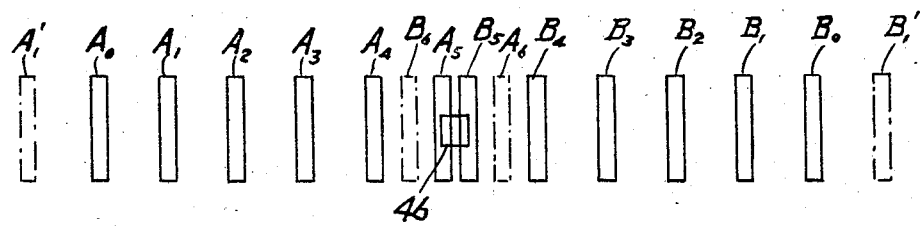
Figure 2 is a diagram illustrating the nature of series of spectra provided in the apparatus of Figure 1 and the application thereof to sound recording.

To understand the effect of the system illustrated in Figure 1, reference may be made to Figure 2, which illustrates the production of spectra of various orders upon the plane of the film (or the surface of the diaphragm 48), forgetting initially the presence of the cylindrical lens 44.

With the quartz crystal vibrating at a particular supersonic frequency, each of the beams will produce a series of spectra of various orders consisting of images of the slits 10 and 12. For example, considering the left hand beam, the direct ray will form a spectrum of zero order indicated at $A_0$. To the right of this will be successive spectra of other orders illustrated at $A_1, A_2, A_3, A_4, A_5, A_6$, etc. To the left there will be a similar series, only one member of which, the first order spectrum, is illustrated at $A_1'$. Similarly, the right hand beam will produce spectra of various orders, illustrated at $B_0 \ldots B_6 \ldots$ and $B_1'$, etc. For the purpose of the present invention, one of the higher order spectra of one series is caused to fall adjacent the corresponding higher order spectrum of the other series, and use is made of these spectra alone, the others being masked from the film by the diaphragm 48. As illustrated in Figure 2, these fifth order spectra are so arranged as to overlap the edges of the opening 46 in the plate 48, and the dimensions are so chosen that this overlapping occurs throughout the used ranges of movement of these spectra.

The dispersion angle of the image of a slit produced with monochromatic light and belonging to the spectrum of order $k$ is given by the expression $$\sin a_k = K \frac{f_s}{f_l}$$

in which $a_k$ is the dispersion angle, $f_s$ is the frequency of the supersonic wave, $f_l$ is the frequency of the monochromatic light and $$K = k \frac{c}{v}$$

$c$ being the velocity of light and $v$ the velocity of the supersonic waves in the liquid medium. Since the angle $a_k$ in any practical system is small even for the fifth order spectrum which is here illustrated as used, the sine of the angle may be replaced by its tangent, so that if $L$ is the distance between the grating and the plane of the film, and $d_k$ is the displacement of the image from the optical center of the system at the screen, the expression which will give the relationship is $$d_k = KL \frac{f_s}{f_l}$$

Since for a given system $K$, $L$ and $f_l$ will be constants, it will be evident that $d_k$ is directly, and almost exactly to a high degree of precision, proportional to $f_s$.

It may be noted that the above is derived from the fact that there is produced a moving optical grating corresponding, except for the substantial third dimension normal to the direction of propagation and parallel to the wave fronts, to a ruled grating in such fashion that the spacings between successive corresponding wave phases (i. e., the wave length) are similar to the spacings between rulings of a conventional optical grating. These spacings are given by $$\frac{v}{f_s}$$

and, therefore, are variable with the supersonic frequency modulations. The three dimensional nature of the gratings described herein gives rise to some phenomena additional to those arising with ordinary ruled gratings as in the modification of Figs. 5 and 6, hereafter described.

Figure 3:
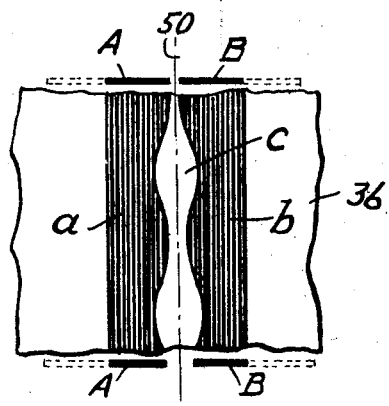
Figure 3 is a diagram illustrating the nature of a sound record produced by the apparatus of Figure 1, together with the movable lines of light projected on the film for recording purposes.

It will be evident, therefore, that if the frequency of the supersonic waves is varied, the images $A_5$ and $B_5$ will move toward and away from each other with displacements directly proportional to the changes of frequency. To record these changes of frequency on the film, the images $A_5$ and $B_5$ are focussed down to lines by the action of the cylindrical lens 44, thereby producing lines moving endwise toward and from each other, as illustrated at A and B in Figure 3, the dotted portions of these lines being screened off by the boundaries of the opening 46. As the film moves across the opening, therefore, there will be exposed varying regions, as indicated at $a$ and $b$ giving, after development, a transparent region $c$ the variations in width of which are proportional to the changes in frequency of the supersonic waves. If, therefore, the supersonic waves are frequency modulated by an audio source, the variations in the width of the transparent region $c$ will correspond to the audio source, being directly proportional to the intensity thereof if the frequency modulation involves no distortion.

It may be remarked at this point that monochromatic or polychromatic light may equally well be used in the system already described. If monochromatic light is used, the width of each of the spectral images used will, of course, be proportional to the width of the slits 10 and 12. If polychromatic light be used, on the other hand, each of the spectra will be widened to the extent of the range of wave lengths used. In any event, the intensities should be such as to carry the exposure of the film during the operation well up into the saturation region of the H and D curve to produce well defined images substantially independent of variations in intensity which may occur due to variations in amplitude of the supersonic waves. As a matter of fact, however, such variations in amplitude may be quite substantially eliminated, first by the use of the driving system illustrated in Figure 4, which will now be described, and secondly by operating under the conditions of approximately maximum intensity of the spectra of the order which is being used. As is well known, such a maximum is reached for each successive spectrum of higher order as the intensity of supersonic waves increases. By taking reasonable precautions in these factors, and by adopting conventional good optical practices, the boundary edges of the record may be made very sharp and totally independent of any slight amplitude variations which may not be conveniently eliminated.

Figure 4:
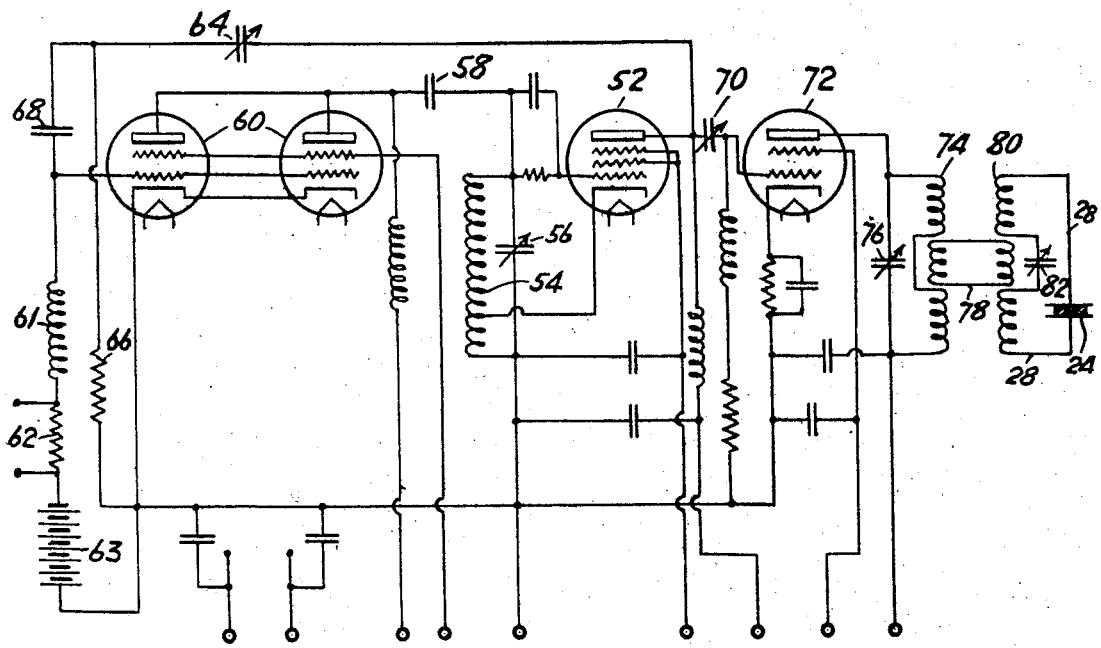
Figure 4 is a wiring diagram of a frequency modulated driving system for a crystal giving rise to the supersonic waves.

The frequency modulated crystal driving circuit may be of any suitable form, of which that illustrated in Figure 4 is typical. Suitable high frequency oscillations are generated by the oscillator comprising the tube 52, the resonant circuit provided by coil 54 and condenser 56 and conventional associated elements, which need not be specifically described. To provide for frequency modulation, there is coupled in parallel with the coil 54 and condenser 56 through the medium of a condenser 58 a variable impedance arrangement which presents effectively to the oscillating circuit an impedance comprising an inductance and a substantially zero resistance. This circuit comprises a pair of tubes 60 arranged in parallel, the pair being used to secure a higher mutual conductance than is conveniently obtainable with one tube alone. The grid circuit of this combination of tubes comprises a radio frequency choke coil 61, a resistor 62, across which the audio input voltage is impressed and a suitable biasing battery 63. The grids are, furthermore, connected through condenser 68 with the junction point of a variable condenser 64 and resistance 66 between the plate of tube 52 and the cathodes of the tubes 60. This arrangement provides a feed-back giving a negative resistance characteristic by control of the variable condenser 64 to balance the positive resistances involved. It will be evident that the effect of this arrangement is, as indicated above, to provide an effective variable inductance without substantial resistance across the tuned oscillator circuit, the effect of which will be to change the frequency in proportion to the amplitude of the audio modulating voltage impressed at 62. Thus the output of the tube 52 is frequency modulated without distortion, as can be ascertained from calculation. The zero resistance characteristic of the circuit is desirable to secure a high degree of frequency modulation with negligible amplitude modulation. It is desirable, for example, using the fifth order spectrum as indicated, to provide a frequency modulation of about 3.3%, i. e., a variation of the frequency to the extent of 3.3% each side of the unmodulated frequency. This may be attained without any appreciable departure from linearity with the circuit illustrated.

The plate of the tube 52 is coupled through a condenser 70 to a frequency doubler arrangement including the tube 72 and the tuned circuit comprising the coil 74 and condenser 76 to secure the desired frequency of operation of the crystal while effecting the control at a lower and more readily handled frequency. The tuned circuit just referred to is closely coupled through a link connection 78 with another tuned circuit comprising a coil 80, condenser 82 and the crystal 24 and its leads. By the use of close coupling, the resonance curve of the tuned circuits is so broadened through the range of variable frequencies used that amplitude modulation of the crystal is avoided at this point. Since the oscillator circuit also effectively avoids production of amplitude modulation, the crystal delivers supersonic waves modulated substantially in frequency alone, as pointed out previously, and amplitude modulation is further reduced by operation in the saturation region of the H and D curve of the film and at the maximum intensity region of the order of spectra used.

While the form of the invention so far described is applied to the formation of a variable width sound track, the variations in which are, to a high degree of approximation, linear with respect to the modulating sound or other impulse, it will be evident that the actual recording may form a sound track of any suitable form, either of variable density or variable width types in their push-pull forms of various classes, single or double forms, squeeze track forms, or the like. For example, variable density tracks may be secured through the use of conventional penumbra producing methods. Such variations involve merely changes in the optical systems in the region of the aperture 46 or in the handling of the dispersed spectra emanating from the supersonic diffraction grating provided by a cell such as 20. It may be remarked, furthermore, that the dispersion may be produced by reflection as well as by transmission illustrated specifically herein, and the medium in which the waves are produced may be solid, liquid or gaseous.

Figures 5, 6:
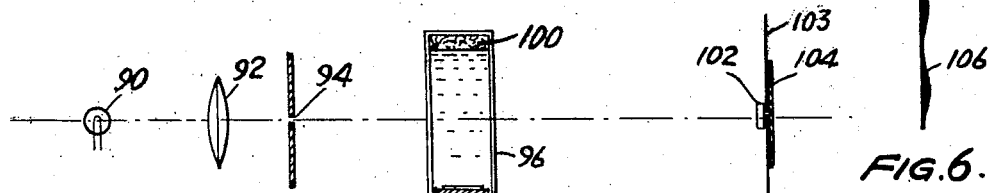
Figure 5 is a diagram illustrating an alternative light modulating arrangement.
Figure 6 is an illustration of the type of record produced on a film by the device of Figure 5.

An alternative system provided in accordance with the invention is illustrated in Figure 5, the system comprising a source of light 90, a condensing lens 92, a slit 94, a cell 96, provided with a crystal 98 and absorbing means 100 and of transparent form, arranged to provide travelling supersonic waves having their fronts substantially parallel to the slit 94 and advancing transversely to the path of light from the slit. The crystal may be driven by means of the type of circuit illustrated in Figure 4. With such an arrangement, there is produced beyond the cell a diffraction pattern consisting of light and dark bands, the characteristics of which are subject to statistical determination, which need not be discussed herein. It is sufficient to point out for the present purposes that the widths of these bands vary, with the low percentages of modulation used, substantially linearly with variations in frequency of the supersonic source. Consequently, by the use of suitable screening means such as 103 and a cylindrical lens 102 adapted to project on a moving film 104 a thin line perpendicular to the direction of motion of the film and extending in the direction of propagation of supersonic waves in the cell 96 there may be produced from a single diffracted image line a track such as indicated at 106 in Figure 6. Such a track will also be substantially linear with respect to the amplitude of the modulating audio frequency or signal.

Figures 7, 8:
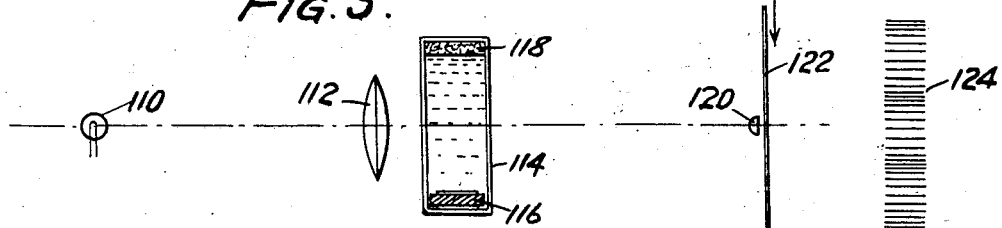
Figure 7 is a diagrammatic view of a further modulating arrangement embodying the principles of the invention.
Figure 8 is a diagram of the type of record produced by the apparatus of Figure 7.
Figure 9:
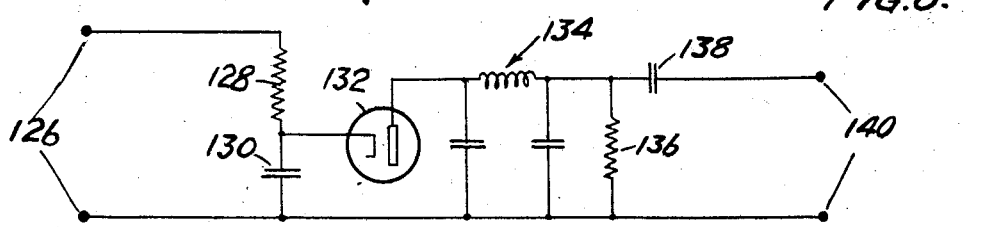
Figure 9 is a wiring diagram illustrating the type of circuit used for producing sound from the record of Figure 8.

Still another type of sound track may be produced by the arrangement illustrated in Figure 7. In the arrangement of this figure, a light source indicated at 110 illuminates through a condenser lens 112 the liquid in a transparent cell 114 in which frequency modulated waves are produced by means of a crystal 116, there being provided an absorbent medium 118, such as glass wool, for preventing reflections from the far end of the cell. In this arrangement as in the preceding one, the crystal may be driven by the type of circuit illustrated in Figure 4. In an arrangement of this type, the supersonic waves are actually visible (from the optical standpoint) due to the compression and expansion regions in the liquid giving rise to changes in index of refraction with the passage of the waves. The waves may accordingly have their images projected upon a film such as 122 by means of a lens system 120 which may, for example, be cylindrical in form. If the film moves at the speed of movement of the images of the waves i. e., at a speed bearing to the actual velocity of propagation in the cell 114 the ratio of the spacings of the images and waves from the optical center of the system, it will be evident that the wave images will be stationary relative to the film, so that transverse striation will be produced on the film as illustrated at 124 in Figure 8. The spacings of these striations will correspond to the spacings of the waves in the cell 114, and if the waves in that cell vary in spacing, due to changes in frequency of the crystal, the spacings of the striations on the film will vary to correspond. Thus there will be produced a track on the film having the striations spaced inversely as the frequency of the supersonic waves producing it. If such a record is then scanned by means of a photocell, as it is moved at a proper speed, it will be evident that the output of the photocell will be a frequency modulated current corresponding to the original frequency modulated waves produced by the crystal. In order to translate such output into audio frequency, any suitable type of frequency modulation detector may be used, embodying, for example, a frequency discriminating circuit such as that illustrated in Figure 9. In this figure, the output of the scanning photocell, which may be amplified, is fed in at 126 across the series arrangement of a resistance 128 and condenser 130. It will be evident that the voltage across the condenser will vary with the frequency, since its impedance in relationship to the resistor 128 varies with the frequency. A rectifier 132 and high frequency filtering arrangement illustrated at 134 results in the production of a pulsating voltage across resistor 136 having direct and audio frequency components. The audio frequency components are delivered through a condenser 138 to the output terminals 140, which may be connected to a suitable audio frequency amplifier. The advantage of this last system is that it not only decreases the noise level usually encountered in sound recording, but it will also allow more light through the optical system, since, due to the projection of images on the film which are stationary with respect to the film, the recording aperture is not limited to the conventional narrow slit, the width of which in conventional systems as well as in the systems of Figures 1 and 5, is limited by considerations of preventing loss of high frequency response.

While the above descriptions have been made specifically with reference to sound recording, involving the application of an audio frequency input, for example, at 62 of Figure 4, it will be evident that there may be introduced at 64 any signal suitable for stroboscopic, facsimile, television or other signalling use, whether it be of low subaudible frequency, of audible frequency, of high supersonic frequency, or merely irregularly intermittent or transient. The invention is applicable in general wherever modulation of light is necessary for any purpose.

What I claim and desire to protect by Letters Patent is:

1. Apparatus for the modulation of light comprising means containing a light transmitting liquid, means for producing frequency modulated supersonic waves in said liquid, means for projecting light through said liquid to produce a spectrum movable in accordance with the variations of frequency of said waves, and means for recording the spectrum movements on a sensitized film.

2. Apparatus for the modulation of light comprising means containing a light transmitting liquid, means for producing frequency modulated supersonic waves in said liquid, and means for projecting light through said liquid to produce a spectrum movable in accordance with the variations of frequency of said waves.

3. Apparatus for the modulation of light comprising means containing a light transmitting liquid, means for producing frequency modulated supersonic waves in said liquid, and means for projecting light through said liquid to produce a plurality of spectra of the same order movable oppositely adjacent each other in accordance with the variations of frequency of said waves.

4. Apparatus for the modulation of light comprising means containing a light transmitting liquid, means for producing frequency modulated supersonic waves in said liquid, means for projecting light through said liquid to produce a plurality of spectra of the same order movable oppositely adjacent each other in accordance with the variations of frequnecy of said waves, and means for recording said spectra movements on a sensitized film.

5. Apparatus for the modulation of light comprising a medium for the transmission of supersonic waves, means for producing frequency modulated supersonic waves in said medium to provide an optical grating having the spacings between successive corresponding wave phases thereof variable in accordance with the frequency of said waves, and means for illuminating said grating to produce light modified in accordance with variations in said grating.

6. Apparatus for the modulation of light comprising a medium for the transmission of supersonic waves, means for producing frequency modulated supersonic waves in said medium to provide an optical grating having the spacings between successive corresponding wave phases thereof variable in accordance with the frequency of said waves, and means for illuminating said grating to produce a spectrum movable in accordance with variations in said grating.

7. Apparatus for the modulation of light comprising a medium for the transmission of supersonic waves, means for producing frequency modulated supersonic waves in said medium to provide an optical grating variable in accordance with the frequency of said waves, and means for illuminating said grating to produce a plurality of spectra of the same order movable oppositely adjacent each other in accordance with the variations of frequency of said waves.

8. Apparatus for the modulation of light comprising a medium for the transmission of supersonic waves, means for producing frequency modulated supersonic waves in said medium to provide an optical grating variable in accordance with the frequency of said means, means for illuminating said grating to produce a spectrum movable in accordance with variations in said grating, and means for recording the spectrum movements on a sensitized film.

9. Apparatus for the modulation of light comprising a medium for the transmission of supersonic waves, means for producing frequency modulated supersonic waves in said medium to provide an optical grating variable in accordance with the frequency of said waves, means for illuminating said grating to produce a plurality of spectra of the same order movable oppositely adjacent each other in accordance with the variations of frequency of said waves, and means for recording said spectra movements on a sensitized film.

10. Apparatus for the modulation of light comprising a medium for the transmission of supersonic waves, means for producing frequency modulated supersonic waves in said medium to provide an optical grating variable in accordance with the frequency of said waves, and means for illuminating said grating to produce at least one light image of varying dimensions in accordance with variations in said grating.

11. Apparatus for the modulation of light comprising a medium for the transmission of supersonic waves, means for producing frequency modulated supersonic waves in said medium to provide an optical grating having the spacings between successive corresponding wave phases thereof variable in accordance with the frequency of said waves, means for illuminating said grating, and means for projecting on a surface an image of the illuminated grating.

12. Apparatus for the modulation of light comprising a medium for the transmission of supersonic waves, means for producing frequency modulated supersonic waves in said medium to provide an optical grating variable in accordance with the frequency of said waves, means for illuminating said grating, and means for projecting on a surface an image of the illuminated grating, said surface being sensitized and moving with said image at substantially the same rate as the image.

JOHN PRESPER ECKERT, JR.